US005497042A

United States Patent [19]

Nettelhoff

[11] Patent Number: 5,497,042

[45] Date of Patent: Mar. 5, 1996

[54] COLLECTOR AND REINFORCED RING THEREFOR

[75] Inventor: Friedrich W. Nettelhoff, Menden, Germany

[73] Assignee: Friedrich Nettelhoff Kommanditgesellschaft Spezialfabrik fuer Kleinkollektoren, Menden, Germany

[21] Appl. No.: 318,752

[22] PCT Filed: Jan. 27, 1994

[86] PCT No.: PCT/EP94/00220

§ 371 Date: Sep. 19, 1994

§ 102(e) Date: Sep. 19, 1994

[87] PCT Pub. No.: WO94/18726

PCT Pub. Date: Aug. 18, 1994

[30] Foreign Application Priority Data

Feb. 1, 1993 [DE] Germany .......................... 43 02 759.8

[51] Int. Cl.[6] .................................................... H02K 13/00

[52] U.S. Cl. .......................... 310/219; 310/235; 310/236

[58] Field of Search .................................... 310/219, 233, 310/235, 236, 194, 43

[56] References Cited

U.S. PATENT DOCUMENTS

| | | | |
|---|---|---|---|
| 2,501,502 | 3/1950 | Flecher | 310/233 U X |
| 3,450,914 | 6/1969 | Demerciere | 310/236 |
| 4,056,882 | 11/1977 | Letts | 310/235 |
| 4,071,796 | 1/1978 | Nippert | 310/236 |
| 4,562,369 | 12/1985 | Gerlach | 310/235 |
| 5,124,609 | 6/1992 | Nagasaka | 310/233 |
| 5,140,213 | 8/1992 | Nettelhoff | 310/219 |

FOREIGN PATENT DOCUMENTS

| | | |
|---|---|---|
| 2670334 | 12/1992 | France . |
| 0120348 | 12/1896 | Germany . |
| 2557310 | 10/1976 | Germany . |
| 0132381 | 9/1978 | Germany . |
| 0251426 | 11/1987 | Germany . |

*Primary Examiner*—R. Skudy
*Attorney, Agent, or Firm*—Jordan and Hamburg

[57] ABSTRACT

For electric motor collectors with lamella inner cross members, which serve for anchoring the individual lamellas, protrude inwards running at least predominantly parallel to the collector axis and are provided with undercut surfaces, which are to be grasped from behind by reinforcing rings. Reinforcing rings are proposed which, aside from a metallic clamping ring, comprise a supporting ring, which is fitted positively into the metallic clamping ring and forms a double body with the clamping ring and is formed from a material, which is resistant to compression and insulating even at high operating temperatures. With this, reinforcing rings are produced from two partial rings, which are easily manufactured and easy to press together, or by the supporting ring which is brought into the clamping ring by injection molding. The reinforcing rings form a unit which can withstand extremely high thermal and mechanical stresses and imparts the collector with very high stability under load and fatigue endurance.

22 Claims, 3 Drawing Sheets

Fig. 5
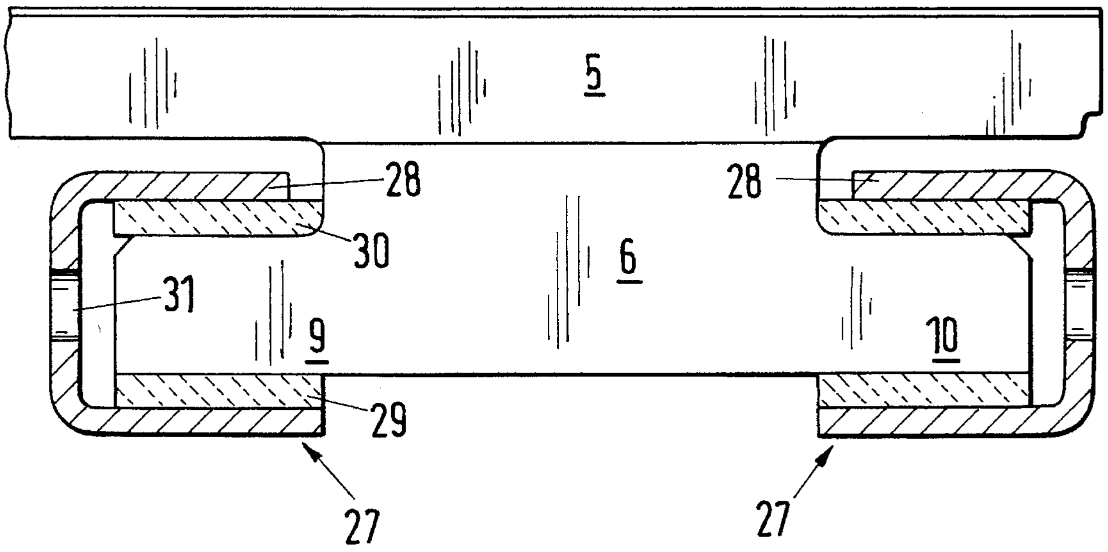
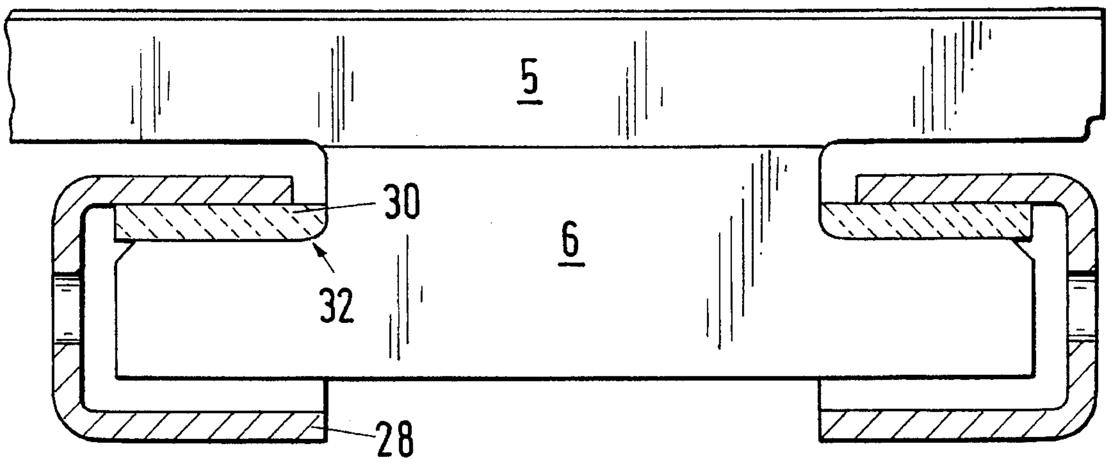
Fig. 6

COLLECTOR AND REINFORCED RING THEREFOR

The invention relates to a collector for an electric motor and a reinforcing ring therefor.

Collectors for simple applications and slight loads can be formed from lamellas and synthetic resin molding compound alone, the lamellas at the periphery being kept at a distance and held by the molding compound, which also forms an internal, annular base structure and typically consists of a thermosetting material which can be reinforced by glass fibers. At higher electrical, thermal and mechanical loads, however, reinforcing rings have proven to be advisable or necessary. Such reinforcing rings embrace the lamellas on the inside at undercuts of internal cross members. Since the lamellas, due to their function, must be insulated electrically from one another, the reinforcing rings must not make conducting contact with the internal cross members.

For this purpose, metallic reinforcing rings, particularly steel reinforcing rings, with an insulating material on the inside as backing in order to achieve a high strength, but also good insulation, have existed for already a long time. This expensive procedure is, however, not appropriate for modern, large-scale manufacturing.

Furthermore, there have been reinforcing rings, which were carefully distanced from the internal cross members of the lamellas during the pressing of the lamellas with synthetic resin molding compound into a collector so that interstices, into which the synthetic resin molding compound can penetrate, were present between the metallic reinforcing ring and the lamellas. However, bracing and insulation of the lamellas, produced in this way, is unsatisfactory and brings about only slight improvements in comparison to a collector without a reinforcing ring, since the synthetic resin molding compound is unable to maintain the insulating distance and the pressure transfer between the reinforcing ring and the cross members of the lamellas at thermal and mechanical loads, which are critical for the synthetic resin molding compound.

The latter is also true for metallic reinforcing rings, particularly for steel reinforcing rings, which have been provided with an insulating layer of synthetic resin in a painting, dipping or sintering process. When the synthetic resin softens, the insulation threatens to collapse.

Reinforcing rings of a conventional composite material, such as a glass fiber-reinforced plastic, have also proven to be unsatisfactory. The stretching of the glass fibers at higher temperatures and under high mechanical loads leads to a "soft" behavior, in which the lamellas, in their integration into the synthetic resin molding compound, begin to work. This leads, in turn, to frictional heat within the collector, to dimensional inaccuracies in the bearing surface of the collector with higher commutator sparking and higher mechanical stresses as a result of the noncircular running of the collector and the dancing collector brushes.

SUMMARY OF THE INVENTION

It is an object of the invention, to provide a collector and a reinforcing ring, which permit the high mechanical and thermal loading capacity, somewhat like that of the metallic reinforcing ring, particularly the steel ring, to be achieved and utilized and, in particular, the weaknesses of known metallic reinforcing rings and their insulation to be avoided.

It can be seen that the weakness of previous reinforcing rings has been their insulation. Admittedly, it was obvious to build up this insulation in the conventional manner with an underlining or casing and, in particular, to start out from synthetic resins, which can be handled well. However, these cause the collectors to be destroyed at the softening or decomposition temperature of the thermoplastic or thermosetting plastic used. On the other hand, the interpositioning of a supporting ring, which is fitted positively into the reinforcing ring and consists of a material that is resistant to compression even at high working temperatures, is suitable for decisively extending the load-carrying capability and the working range of such a collector.

The concept of "supporting ring" reflects the recognition that it is a component, which has decided supporting functions, namely a pressure transfer resulting from the centrifugal force between the metallic clamping ring and the lamellar extensions. It is not necessary that such a supporting ring be able to absorb tensile forces— these can be loaded onto the clamping ring. In this connection, it is also of interest that such a supporting ring forms a unit, which can be fitted into the clamping ring. This assures a good graspability and trueness to shape in the manufacture and assembly of the clamping ring and the supporting ring during the production of the collector, such as is required particularly for mechanical aids. This also includes that the clamping ring and the supporting ring fit into one another positively, advisably even with press fit, so that these not only can be used, when handled, as if they were a combined intermediate ring, but also ensure in the highly stressed collector, which is in use, a solid unit with good transfer of pressure from the clamping ring to the supporting ring and from this to the lamellas.

In the simplest case, the supporting ring can consist of glass or of a different ceramic material in order to ensure resistance to the effects of high temperature and compression. In the finished collector, molded with molding compound, such a ring is fixed and is loaded almost exclusively in compression, such materials being able to achieve an extremely high stability under load. Glass-ceramic and other ceramic materials can be manufactured precisely and economically with modern manufacturing means.

The manufacture of a supporting ring from a fiber composite, such as a glass fiber-reinforced plastic, is a more common technique. In this connection, it is important that the material be a highly filled one. For example, bobbins can be manufactured, in which the thermoplastic or thermosetting synthetic resin matrix portion is minimized and occupies only the unavoidable interstices between the fibers; otherwise, however, the fibers lie largely directly against one another. Such a composite body can be manufactured, for example, by current bobbin technique as a pipe, the fibers being deposited with high tension and the adhering matrix material being squeezed to the outside, where it is stripped off or, after hardening, turned off on the lathe.

The high degree of filling of the fiber-reinforced synthetic resin has proven to be highly important for the stability under load of such a supporting ring. The concept behind this is that the glass fibers, which lie directly against one another and are firmly wound on top of one another, are able to withstand high local pressure within the collector between clamping ring and a particularly loaded inner cross member of the lamellas, even when the material of the matrix is no longer able to make a useful contribution to the strength. Because of their packing density, the fibers of a ring, so wound, retain their compact juxtaposition and also, because they are long and fixed in the peripheral direction, their position even in the boundary region for a long time. With that, the insulation of the glass fibers is maintained, even when the synthetic resin components in the reinforcing ring have softened.

Something similar can be brought about in a compression molded supporting ring, if the fiber material is pressed under squeezing pressure into the shape of a ring, pipe or panel, and moreover in a manner, which brings the fibers themselves into a supporting composite. These can also create compact, compression-resistant intermediate layers between clamping ring and inner cross member, even at the softening temperature of the material of the matrix. In this connection, it should, of course, also be taken into consideration that the lamellar body of synthetic resin molding compound surrounds and forms the boundary of the inner region of the clamping ring, so that even fibers, inadequately joined together, cannot freely give way or migrate.

In the preceding, mainly glass fibers are taken into consideration as fiber material, even though it is self evident that other suitable fibers of high resistance to the effects of high temperatures and of compression, particularly mineral fibers and ceramic fibers, likewise come into consideration.

The filler material of the supporting ring, which determines the compression strength, need also not be present in fiber form. A granular, platelet-like or tape-shaped structure of a suitable material, in principle, also appears to be suitable, if, using as little of the synthetic resin as possible, a supporting ring, which can be handled accurately, retains its shape and is resistant to the effects of high temperatures and of pressure, can be manufactured with it.

Preferably, the supporting ring has an axial overhang over the clamping ring on at least one side, so that it can be pushed with this side first into an undercut of the inner cross members and precludes also laterally a direct contact between clamping ring and inner cross member.

On the other side, the clamping ring can have a bent cross sectional profile, in order to bring about a lateral, positive locking to the supporting ring with it and, during the handling, especially when bringing the reinforcing ring into a collector and when pressing, to obtain a high degree of certainty that the clamping ring and supporting ring will not detach from one another or shift relative to one another even when there is a rapid change in temperature.

A metallic clamping ring with a bent cross sectional profile can be manufactured relatively easily, since modem stamping techniques make possible a stamping manufacture, which starts out from simple sheet metal panels. For this purpose, the initially circular, plane parts are deep drawn into the shape of a pot. A ring is then stamped out from the flanks of the deep-drawn region by "mortising". The pot or hat profile obtained results in an angular cross section without special precautionary measures, depending on the diameter of the mortise chosen.

Six Examples of the subject matter of the invention are shown in the drawing and are described in greater detail in the following.

BRIEF DESCRIPTION OF THE DRAWINGS

FIGS. 1 to 6 show different clamping rings assigned to a lamella according to the built-in position.

DESCRIPTION OF THE PREFERRED EMBODIMENTS

Figure 1:
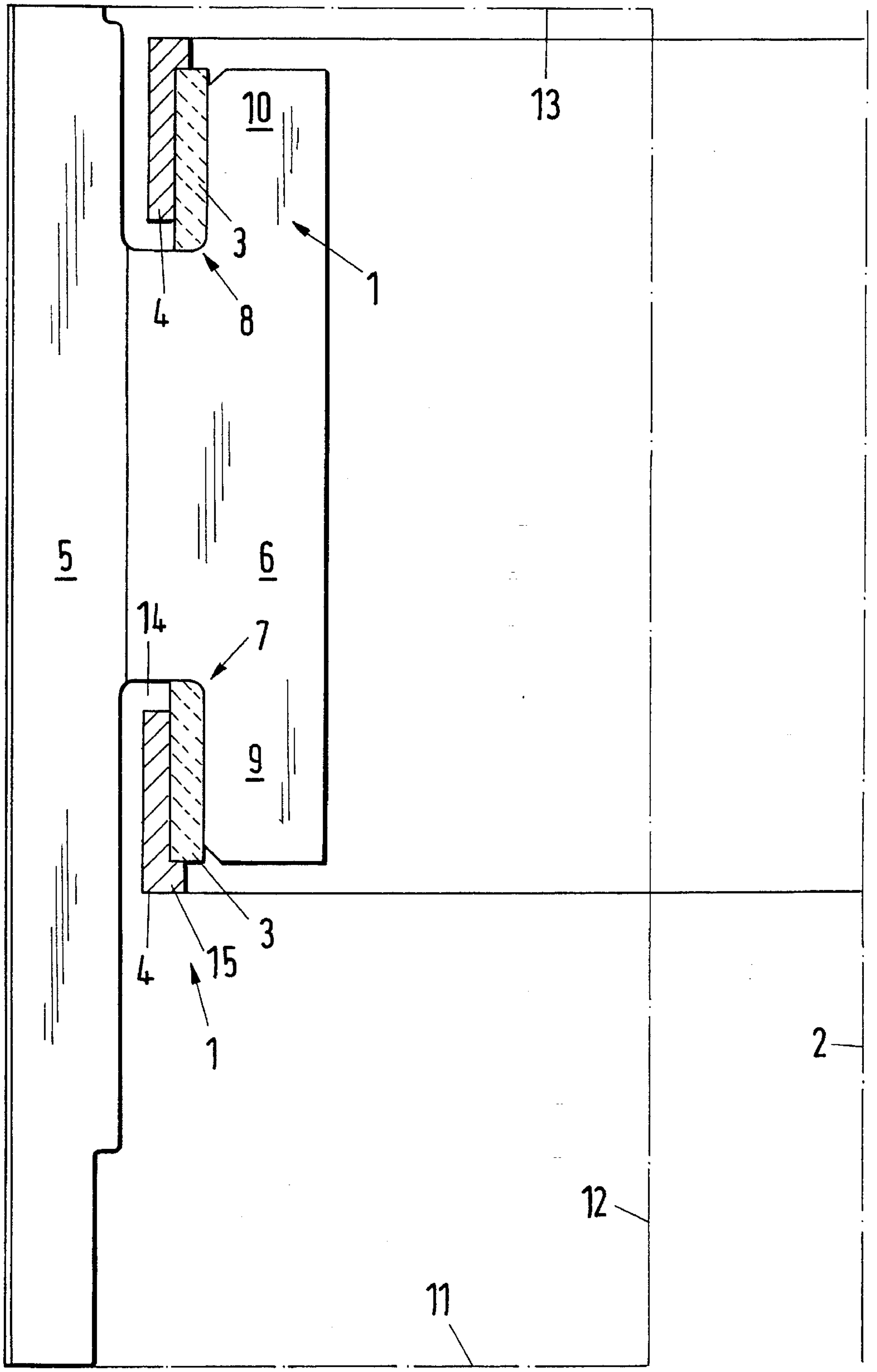

In FIG. 1, two reinforcing rings 1 run coaxially with the center axis 2 of a collector. They consist of a supporting ring 3 and a clamping ring 4. The reinforcing rings grip behind collector lamellas, of which only one 5 is drawn, by way of example, in its position intended for the finished collector.

This lamella is continued with an internal cross member 6 towards the center axis 2 of the collector. The internal cross member 6 has two undercuts 7 and 8, which leave extensions 9 and 10 at the inner cross members. These extensions 9 and 10 are enclosed by the clamping ring 4, so that the lamellas do not centrifugally change course, especially from the center axis 2 of the collector to the outside. In the finished collector, a cross sectional region, marked by the lines of dots and dashes 11, 12 and 13, is filled with a synthetic resin molding compound (not shown), so that a cylindrical torus is formed.

In the case of the known basic concept of such a collector with a clamping ring embracing the inner cross members 6 of the lamellas 5 at the undercuts 7, 8, the inventive clamping rings shown have a special construction. The supporting ring consists of a glass fiber/synthetic resin composite, which is highly filled with glass fiber material and in which the proportion of synthetic resin forming a matrix is kept so small, that it permits the glass fiber material to lie firmly on top of one another. The supporting ting has a simple, ring shape with a fiat, rectangular cross section, which firmly embraces the extensions 9 and 10 positively.

The respectively associated clamping ring 4 is a steel ring, which is distanced by the supporting ring 3 from the copper of the lamellas of the inner cross member 6 and also from the actual lamellar body. Together with the sealing ring, it forms a reinforcing ring, which can be handled jointly. In the interest of reliable handling and, even more, in the interests of a pressure-transferring connection between the two ring parts (clamping ring/supporting ring), a press fit is specified. Clamping ring and supporting ring thus form a rigid and solid unit as reinforcing ring. In the same way, the supporting ring can be injection molded into the clamping ring the supporting ring is insulating at temperatures above 200° C.

Whereas the axial length of the supporting ring 3 corresponds approximately to the axial length of the undercut 7 or 8 and, with that, covers the undercut in the axial direction, the clamping ring 4 is superimposed thereon axially offset. This creates an axial interstice 14 as insulating distance between the clamping ring and the copper of the lamella. On the other side, the clamping ring forms a radially inwards pointing shoulder 15, which grasps behind the supporting ring 3 and with which the clamping ring protrudes axially over the supporting ring. This shoulder 15, on the one hand, creates good inherent stability against oval deformations of the clamping ring and, on the other, also offers the possibility, for machine handling of the reinforcing rings 1, to take hold of this rings 1 safely and press it uncritically into a set of lamellas, which is ready for assembly.

The arrangement, so created, can be filled subsequently with synthetic resin molding composition to form a finished collector. The clamping ring 4 is then held in its position by the synthetic resin molding composition and insulated from the copper of the lamellas at its outer periphery as well as in the interstice 14 by the synthetic resin molding composition.

Figure 2:
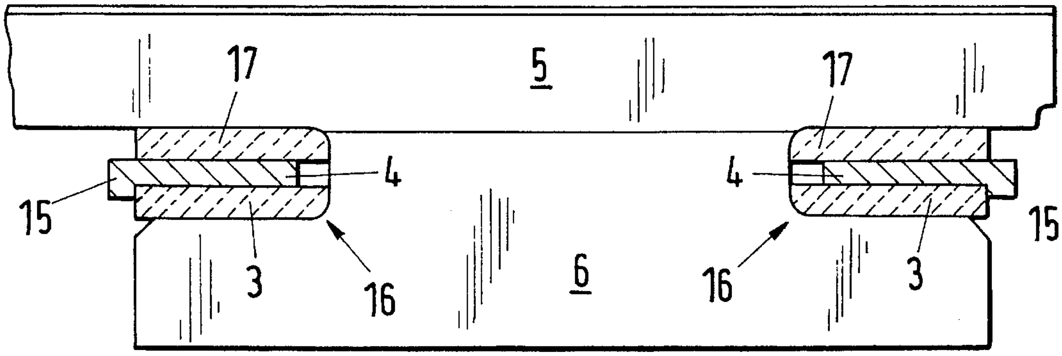

In FIG. 2, two identical reinforcing rings 16 are shown in cross section in relation to a lamella 5, which is shown only partially. The reinforcing rings 16 each comprise an inner supporting ring 3 and a clamping ring 4, which correspond, in each case, with the supporting ring 3 and the clamping ring 4 of FIG. 1. An additional outer supporting ring 17 encloses the clamping ring 4 with press fit and is thus a fixed component of the reinforcing ring 16. This supporting ring 17 also ensures support for the lamellas 5 against compression inwards, so that these do not move out of the way inwards because of special external loads and, with that, bring about an oval deformation within the collector and an additional load on adjacent lamellas in the sense of a moving out of the way towards the outside.

Figure 3:
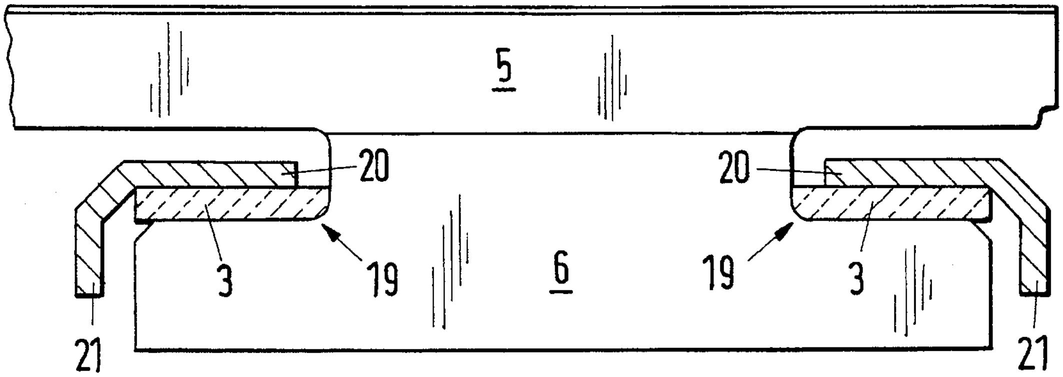

In FIG. 3, a lamella of the previously considered type is shown once again. Like all the remaining lamellas of a collector, arranged into a ring, these lamellas are to be held together by reinforcing rings 19, which consist of a supporting ring 3 (which is identical with the supporting ring of corresponding number in FIGS. 1 and 2) and a clamping ring 20, which differs from the previously considered clamping rings essentially owing to the fact that it has a very extensive cross-sectional elbow 21, which clearly extends radially inward outside of the undercuts of the lamella. This cross-sectional elbow imparts high inherent stability against oval deformations and elastic natural oscillations.

Figure 4:
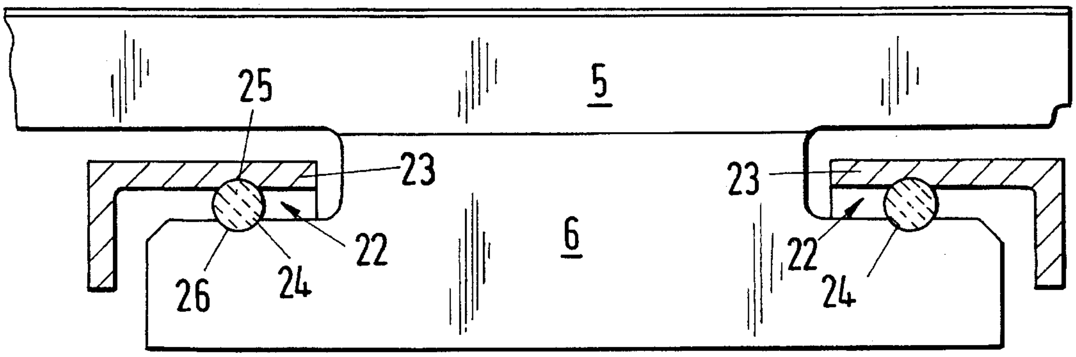

In FIG. 4, two reinforcing rings 22 are shown, which comprise a clamping ring 23 with angular cross section (to this extent, similar to the clamping ring 20 in FIG. 3). A supporting ring 24 with a relatively small cross section is provided, which is pressed into an angular groove 25 of the clamping ring and finds, on the other side, a fitting hollow notch 26 in the inner cross member 6 of the lamella 5. By these means, the clamping ring 23, supporting ring 24 and lamella 5 are axially fixed positively.

In FIG. 5, a particularly complex reinforcing ring 27 is shown at each axial end of the inner cross member 6 of a lamella, constructed as in the preceding examples. This reinforcing ring 27 is capable of bearing high loads and, in cross section, has a U-shaped clamping ring 28, which encloses the corresponding extension 9 or 10 of the lamella 5 radially outwards as well as radially inwards. On each side, a compression resistant connection is established by a supporting ring 29 or 30 respectively with a flat rectangular cross section, so that the extension 9 or 10 is clamped as if between parallel clamping jaws and does not bend under load and thus cannot more or less "slip out" of the hold of the clamping ring 28. At its face formed by a U-leg, the clamping ring 28 has holes 31, which enable the synthetic resin molding compound to pass through easily during the pressing.

The above-described embodiment of a clamping ring 27 is to be compared in FIG. 6 with a simplified form of a damping ring 32, for which the second supporting ring 29 and, accordingly, the clamp function, are omitted. With only one supporting ring 30, there is thus only a radial holding function and, moreover, one against loads acting in the centrifugal direction. However, the U-shaped cross section of the corresponding clamping ring 28 provides a high load absorption and inherent stiffness. At the same time, it is in a position as if it were a ring, which stiffens the inner borehole of such a collector against overloading during pressing onto a shaft.

In all the examples described, the supporting ring is a component, which is stressed mainly in compression and therefore can readily be manufactured from ceramic. materials. In particular, in the case of a manufacturing process, which is initially separated from the clamping ring, simple and advantageous manufacturing possibilities arise. Finally, a pressing together of clamping ring and supporting ring meets the modern requirements of rapid and space-saving manufacturing and holds the supporting ring under a pretension, which is advantageous for its task.

I claim:

1. A unitized ring means for an electric motor collector having a collector axis and individual lamellas having lamellar inner cross members which secure said individual lamellas and wherein the cross members project outwardly and extend generally parallel to said collector axis and wherein the cross members have undercut faces which are adapted to receive said unitized ring means, said unitized ring means comprising a metallic clamping ring and an insulating supporting ring on the inner surface of said clamping ring, said metallic clamping ring and said insulating supporting ring having a pre-tensioned relationship such that said metallic clamping ring and said insulating supporting ring are joined solidly together as a unit by said pre-tensioned relationship, said unitized ring means being disposed on said cross members such that said supporting ring faces said undercut faces, said supporting ring comprising a material which is compression-resistant and insulating effective at high operating temperatures.

2. A unitized ring means for an electric motor collector according to claim 1 wherein said pre-tensioned relationship is obtained by securing said supporting ring to said clamping ring by a press fit.

3. A unitized ring means for an electric motor collector according to claim 1 wherein said pre-tensioned relationship is obtained by molding said supporting ring onto said clamping ring.

4. A unitized ring means for an electric motor collector according to claim 1 wherein said supporting ring is effective to be pressure resistant and to be insulating effective at temperatures above 200° C.

5. A unitized ring means for an electric motor collector according to claim 1 wherein said supporting ring has an outer surface which defines the largest diameter of said supporting ring, said supporting ring having a longitudinal end, said clamping ring having a projecting portion disposed beyond said longitudinal end and extending further radially inwardly than said outer surface of said supporting ring.

6. A unitized ring means for an electric motor collector according to claim 1 wherein said supporting ring has a cylindrical configuration with an outer cylindrical surface spaced from an inner cylindrical surface, said supporting ring having a longitudinal end surface, said clamping ring having an inner cylindrical surface disposed on said outer cylindrical surface of said supporting ring, said clamping ring having a flange portion projecting radially inwardly of said inner cylindrical surface of said clamping ring, said flange portion abutting said longitudinal end surface of said supporting ring.

7. A unitized ring means for an electric motor collector according to claim 1 wherein said supporting ring has a cylindrical configuration with an outer cylindrical surface spaced from an inner cylindrical surface, said supporting ring having a longitudinal end, said clamping ring having a projecting portion disposed beyond said longitudinal end and extending further radially inwardly that said inner cylindrical surface of said supporting ring.

8. A unitized ring means for an electric motor collector according to claim 7 wherein said projecting portion has at least one part which is disposed at an acute angle relative to said collector axis.

9. A unitized ring means for an electric motor collector according to claim 8 wherein said at least one pan has a frustro-conical configuration.

10. A unitized ring means for an electric motor collector according to claim 1 wherein said clamping ring has an outer surface, and further comprising a second supporting ring on said outer surface of said clamping ring.

11. A unitized ring means for an electric motor collector according to claim 1 wherein said clamping ring has a U-shaped cross sectional configuration.

12. A unitized ring means for an electric motor collector according to claim 11 wherein said U-shaped clamping ring has two cylindrical leg sections, one of said cylindrical leg sections being disposed about said supporting ring, and further comprising a second supporting ring disposed radially inwardly of the first said supporting ring, the other of said two cylindrical leg sections being disposed radially inwardly of said second supporting ring.

13. A collector for an electric motor comprising copper lamellas, said lamellas having inner cross members having undercuts which form extensions, a unitized ring means disposed about said extensions, unitized ring means comprising an outer metallic clamping ring element disposed about an inner insulating supporting ring element, said metallic clamping ring element and said insulating supporting ring element having a pre-tensioned relationship such that said metallic clamping ring element and said insulating supporting ring element are joined solidly together as a unit by said pre-tensioned relationship, said insulating supporting ring element having an inner side facing said extensions, said insulating supporting ring element comprising a material which is compression-resistant and insulating effective at high operating temperatures, and an insulating carrier of synthetic resin molding compound disposed about said extensions and about said unitized ring means.

14. A collector according to claim 13 wherein said metallic clamping ring element has an inner cylindrical surface, said insulating supporting ring element having an outer cylindrical surface, said pre-tensioned relationship providing tensioned contact between said inner and outer cylindrical surfaces.

15. A collector according to claim 14 wherein said inner and outer cylindrical surfaces have a common cylindrical axis, said collector having a longitudinal axis coincident with said common cylindrical axis, said insulating supporting ring element having an inner cylindrical surface having a cylindrical axis coincident with said longitudinal axis of said collector, said inner cylindrical surface of said insulating supporting ring element having a first diameter, said extensions having contact surfaces contacting said inner cylindrical surface of said insulating supporting ring element, said contact surfaces of said extensions defining a cylindrical extension surface having a second diameter substantially equal to said first diameter.

16. A collector according to claim 15 wherein said lamellas have a cylindrical lamella surface disposed radially outwardly of said cylindrical extension surface, said unitized ring means being disposed between said cylindrical lamella surface and said cylindrical extension surface, said cylindrical lamella surface having a cylindrical axis coincident with said longitudinal axis of said collector, said undercut which forms said extensions having an inner longitudinal end surface which is generally perpendicular to said longitudinal axis of said collector, said cylindrical extension surface and said cylindrical lamella surface terminating substantially at said inner longitudinal end surface.

17. A collector according to claim 16 wherein said extensions have an outer longitudinal end surface which is generally perpendicular to said longitudinal axis of said collector, said inner longitudinal end surface being longitudinally spaced from said outer longitudinal end surface a first longitudinal length, said insulating supporting ring element having a second longitudinal length substantially equal to said first longitudinal length.

18. A collector according to claim 16 wherein said insulating supporting ring element has an inner longitudinal end surface which abuts said inner longitudinal end surface of said extensions, said clamping ring element having an inner longitudinal end surface spaced from said inner longitudinal end surface of said undercuts, said insulating carrier being disposed between said inner longitudinal end surface of said clamping ring element and said inner end surface of said undercuts.

19. A collector according to claim 16 wherein said clamping ring element has an outer cylindrical surface, said cylindrical lamella surface being spaced radially outwardly of said outer cylindrical surface of said clamping ring element, said insulation carrier being disposed between said cylindrical lamella surface and the outer cylindrical surface of said clamping ring element.

20. A collector according to claim 16 wherein said clamping ring element has an outer cylindrical surface, said cylindrical lamella surface being spaced radially outwardly of said outer cylindrical surface of said clamping ring element, and a second insulating supporting ring disposed between said cylindrical lamella surface and said outer cylindrical surface of said clamping ring element, said clamping ring and said second insulating supporting ring element having a pre-tensioned relationship such that said clamping ring and said second insulating supporting ring are joined solidly together as a unit by said pre-tensioned relationship, said second insulating supporting ring element comprising a material which is compression resistant and insulating effective at high operating temperatures.

21. A collector according to claim 14 wherein said supporting ring element has a first outer longitudinal end surface, said clamping ring element having a second outer longitudinal end surface spaced longitudinally from said first outer longitudinal end surface, said clamping ring element having an inner projection located at said space between said first and second outer longitudinal end surfaces, said outer cylindrical surface of said supporting ring element having an outer diameter, said inner projection having an inner diameter less than said outer diameter of said outer cylindrical surface of said supporting ring, said inner projection abutting said outer longitudinal end surface of said supporting ring.

22. A collector for an electric motor comprising copper lamellas, said lamellas having inner cross members having undercuts which form extensions, a ring means disposed about said extensions, said ring means comprising an outer metallic clamping ring element disposed about an inner insulating supporting ring element, said extensions defining a cylindrical extension surface, said clamping ring element having an inner cylindrical surface spaced radially outwardly of said cylindrical extension surface, said supporting ring element being disposed between said cylindrical extension surface and said inner cylindrical surface of said clamping ring, said inner cylindrical surface of said clamping ring element having an annular groove, said cylindrical extension surface having a notch, said supporting ring element having a generally circular cross section and being disposed in said annular groove and in said notch to thereby fix said supporting ring element in a fixed axial position between said cylindrical extension surface and said inner cylindrical surface of said clamping ring, said supporting ring element comprising a material which is compression-resistant and insulating effective at high operating temperatures, and an insulating carrier of synthetic resin molding compound disposed about said extensions and about said ring means.

* * * * *